(12) United States Patent
Babić-Samardžija et al.

(10) Patent No.: US 8,765,020 B2
(45) Date of Patent: Jul. 1, 2014

(54) METHOD FOR REDUCING METAL CORROSION

(75) Inventors: Ksenija Babić-Samardžija, Katy, TX (US); Lawrence N. Kremer, The Woodlands, TX (US); David J. Poelker, Missouri City, TX (US); Vladimir Jovancicevic, Richmond, TX (US); Sunder Ramachandran, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 277 days.

(21) Appl. No.: 12/781,098

(22) Filed: May 17, 2010

(65) Prior Publication Data

US 2010/0301275 A1 Dec. 2, 2010

Related U.S. Application Data

(60) Provisional application No. 61/181,140, filed on May 26, 2009.

(51) Int. Cl.
*C09K 3/00* (2006.01)
*C23F 11/00* (2006.01)

(52) U.S. Cl.
USPC .......... 252/391; 252/387; 252/390; 252/392; 252/394; 252/395; 252/396

(58) Field of Classification Search
USPC .................. 252/387, 390–392, 394–396
See application file for complete search history.

(56) References Cited

U.S. PATENT DOCUMENTS

| | | | | |
|---|---|---|---|---|
| 2,596,450 | A | * | 5/1952 | Wachter et al. ............ 106/14.37 |
| 5,643,534 | A | | 7/1997 | Minevski |
| 5,756,004 | A | | 5/1998 | Brezinski |
| 5,976,416 | A | * | 11/1999 | Brezinski ................ 252/389.62 |
| 6,045,719 | A | | 4/2000 | Meszaros et al. |
| 6,540,943 | B1 | * | 4/2003 | Treybig et al. ............... 252/391 |
| 2002/0139959 | A1 | * | 10/2002 | Alink et al. .................. 252/388 |
| 2008/0181813 | A1 | * | 7/2008 | Greaves et al. .................. 422/7 |
| 2009/0020186 | A1 | | 1/2009 | Pipko et al. |

FOREIGN PATENT DOCUMENTS

| | | | |
|---|---|---|---|
| KR | 10-044464 | | 8/1997 |
| SU | 135469 | * | 2/1961 |
| WO | WO 97/30133 A1 | | 8/1997 |

OTHER PUBLICATIONS

Birss et al. Adsorption of quaternary pyridinium compounds at Pt electrodes in neutral and weakly alkaline solutions. Journal of Electroanalytical Chemistry 550-551 (2003) 67-79.*
Jiashen et al. Control of corrosion by inhibitors in drilling muds containing high concentration of hydrogen sulfide. Corrosion (1993) 49 (2).*
"Air" Encyclopedia Britannica. Encycloepdia Britannica Online Academic Edition, 2013. Web Jan. 11, 2013.*
Gulbrandsen et al. "Effect of Oxygen Contamination on the Inhibition of CO2 Corrosion" Corrosion NACE International, 2001.*
Wang, Effect of Oxygen on CO2 Corrosion of Mild Steel. Thesis: Russ College of Engineering and Technology of Ohio University. Mar. 2009.*
Jose D. Figueroa et al., "Advances in CO2 Capture Technology—The U.S. Department of Energy's Carbon Sequestrian Program," Int. Journal of Greenhouse Gas Control 2 (2008) 9-20.
Y. Soong et al., "Novel Amine Enriched Solid Sorbents for Carbon Dioxide Capture," U.S. Department of Energy, National Energy Technology Laboratory.
Daniel J. Fauth et al., "Eutectic Salt Promoted Lithium Zirconate: Novel High Temperature Sorbent for CO2 Capture," Fuel Processing Technology 86 (2005) 1503-1521.
CO2 Capture Project.
Hsumling Bai et al., Removal of CO Greenhouse Gas by Ammonia Scrubbing, Ind. Eng. Chem. Res., 1997, 36 (6), 2490-2493.
Xiaonian Li et al., "Removal of Carbon Dioxide from Flue Gas by Ammonia Carbonation in the Gas Phase," Energy Fuels, 2003, 17 (1), 69-74.
International Search Report dated Jan. 3, 2011 for International Application No. PCT/US2010/035250.

* cited by examiner

*Primary Examiner* — Harold Pyon
*Assistant Examiner* — Tanisha Diggs
(74) *Attorney, Agent, or Firm* — Mossman Kumar & Tyler PC

(57) ABSTRACT

Mitigating or preventing corrosion of metal may be achieved in systems that are alkaline, such as carbon dioxide capture systems. The method may include adding an additive to a system wherein the system is at an alkaline pH; the system has both $O_2$ and $CO_2$ present; or the system is at an alkaline pH and has both $O_2$ and $CO_2$ present. The additive may be selected from the group consisting of: quaternary aromatic amines; quaternary alkyl substituted aromatic amines; and combinations thereof. The corrosion inhibiting properties of the additives may be increased by use of synergistic combinants. The abstract is submitted with the understanding that it will not be used to interpret or limit the scope or meaning of the claims.

2 Claims, No Drawings

METHOD FOR REDUCING METAL CORROSION

CROSS REFERENCE TO RELATED APPLICATION

This application is claims priority from U.S. Provisional Patent Application Ser. No. 61/181,140 for "Method for Reducing Metal Corrosion", filed on May 26, 2009.

BACKGROUND OF THE DISCLOSURE

1. Field of the Invention

The invention relates to additives useful for reducing metal corrosion and methods of employing same. The invention particularly relates to additives useful for reducing metal corrosion in systems having an alkaline pH and methods of employing same.

2. Background of the Art

The following discussion is provided solely to assist the understanding of the reader, and does not constitute an admission that any of the information discussed or references cited constitute prior art to the present invention.

$CO_2$ is a greenhouse gas that that is believed to contribute to the phenomena known as global warming. In 2005 there were 25 billion metric tons of anthropogenic $CO_2$ released into the atmosphere, approximately one third of that was from the combustion of coal for the production of electricity. It would be desirable in the art of employing fossil fuels to capture and sequester $CO_2$.

It follows then, that coal-fired power plants represent a logical place to begin emission reduction strategies, as they contribute significant point source emissions. Some strategies include but are not limited to underground storage in geological formations or oil and gas depleted sites, biological fixation of $CO_2$ to plant material, and chemical conversion to water-soluble or water-insoluble mineral carbonates. Strategies of burying $CO_2$ are commonly referred to as carbon dioxide sequestration. However, conversion of $CO_2$ into mineral carbonates that can be used for industrial applications, such as building materials, can be referred to as carbon dioxide transformation since the carbon dioxide is reused for other anthropogenic purposes.

At least some known carbon separation technologies intervene at different points in coal (and/or natural gas) systems. For example, carbon separation technologies that separate $CO_2$ from combustion flue gases are generally known as post-combustion carbon separation technologies. Known post-combustion carbon separation technologies include processes such as, but not limited to, physical absorption, cryogenic separation, solid sorbent separation, chemical looping combustion, chemical absorption, and/or membrane separation.

Some known chemical absorption processes attempt to remove $CO_2$ from other combustion gases by an exothermic reaction of $CO_2$ with separation solvents, for example, potassium carbonate, sodium hydroxide, and amine-based solvents. Known amine-based liquids may include alkanol amines, for example, diethanolamine, triethanolamine, activated methyl diethanolamine, and monoethanolamines (MEA). Use of amino acids is also known. During a known chemical absorption process, for example, a flue gas and an amine-based liquid such as MEA counter-currently flow within an absorber (scrubber). The flue gas may enter the scrubber near a bottom end, flow upward, and exit near an opposing top end. The liquid may enter the scrubber near the top end, flow downward, and exit near the bottom end.

SUMMARY OF THE INVENTION

In one aspect, the invention is a method for mitigating or preventing corrosion of metal, the method including adding an additive to a system wherein:
the system is at an alkaline pH;
the system has both $O_2$ and $CO_2$ present; or
the system is at an alkaline pH and has both $O_2$ and $CO_2$ present; and
the additive is selected from the group consisting of:
quaternary aromatic amines;
quaternary alkyl substituted aromatic amines; and
combinations thereof.

In another aspect, the invention is a method for mitigating or preventing corrosion of metal, the method including adding an additive to a system wherein: the system is at an alkaline pH;
the system includes ammonia or an amine;
the system has both $O_2$ and $CO_2$ present; or
the system is at an alkaline pH and has both $O_2$ and $CO_2$ present; and
the additive is selected from the group consisting of:
quaternary aromatic amines;
quaternary alkyl substituted aromatic amines; and
combinations thereof.

In still another aspect, the invention is in a process for capturing and sequestering $CO_2$ produced from the combustion of fossil fuels where a system is utilized to convey or retain combustion gases and those combustion gases include $O_2$ and $CO_2$ and/or the system has a fluid present that is at a pH of 8 or higher, the improvement including employing a corrosion inhibitor comprising a component selected from the group consisting of: quaternary aromatic amines; quaternary alkyl substituted aromatic amines; and combinations thereof.

DESCRIPTION

In the practice of an embodiment of the invention, an additive is introduced into a system. For the purposes of this application, a system is an apparatus, section of pipe or pipeline, or any other construction which includes metal and a corrosive aqueous solution. In some embodiments, the system is a device or apparatus used to separate $CO_2$ from combustion gases. For example, in one embodiment, the system referenced by the application may be a $CO_2$ separation unit which is part of a "$CO_2$ Capture Unit." Such capture units may be used with any form of $CO_2$ capture process, including but not limited to underground storage, biological fixation, and chemical conversion processes.

In one embodiment, a method of the application may be applied to a system where $O_2$ and $CO_2$ are present. In another embodiment, the method of the application may be applied to a system where the pH is alkaline. In still another embodiment, the pH may be alkaline and $O_2$ and $CO_2$ are present.

For the purposes of this application, the term "$O_2$ may be present" means that oxygen is present in solution at a concentration of at least about 1 ppm. In some embodiments, the $O_2$ may be present at a concentration of at least about 2 ppm. In still other embodiments, the $O_2$ may be present at a concentration of at least about 3 ppm. In still embodiments, the O2 concentration may be as high as 1% or, in other embodiments, even higher.

For the purposes of this application, the term "$CO_2$ may be present" means that carbon dioxide is present at a concentration of at least about 3 percent. In some embodiments, the CO$_2$ may be present at a concentration of at least about 15 percent. In still other embodiments, the CO$_2$ may be present at a concentration of at least about 20 percent.

In some embodiments of the method the application, additives are introduced into a basic system wherein the pH is alkaline, for example at least 8. In some embodiments, the pH is 10 and in others it is 11 or higher. In other embodiments, the pH of the system may be as high as 13.

The additives of the method of the application may be introduced into a system using any method known to be useful to those of ordinary skill in the art of running such systems. For example, when the system is a unit designed to extract CO$_2$ from exhaust stack, sometimes referred to as a flue, the additive may be added to an amine or ammonia solution that is used to trap carbon dioxide. In an application such as this, the additives may be added directly to the solution or first admixed with a solvent and then added to solution.

In one embodiment of the method of the application, a corrosion inhibiting additive includes a component selected from quaternary aromatic amines and quaternary alkyl substituted aromatic amines. For example, quaternary pyridine and quinolines may be used.

When the corrosion inhibiting additive includes an alkyl substituted quaternary pyridine, any alkyl substituted quaternary pyridine compound may be used. Exemplary of such compounds are: N-butyl-4-methylpyridinium chloride, dodecylpyridinium chloride and tetradecylpyridinium chloride, N-methylpyridinium chloride, N-methylpyridinium bromide, N-ethylpyridinium chloride, N-ethylpyridinium bromide, 2-vinylpyridinium chloride, 2-vinylpyridinium bromide, 3-vinylpyridinium chloride, 3-vinylpyridinium bromide, 4-vinylpyridinium chloride and 4-vinylpyridinium bromide. Mixtures of these compounds may also be used as the additives.

When the corrosion inhibiting additive includes an alkyl substituted quaternary quinolines, then any alkyl substituted quaternary quinolines may be used. For example, methyl or ethyl quinolines and the like may be used as well as mixtures of same. Of course, quaternary quinoline and/or pyridine may be used. Further, for all of these compounds any anion may be used as the counter ion, including any halogen ion. In some embodiments, the counter ion will be chloride.

In some embodiments the method of the application will incorporate an additional compound that combines synergistically with the quaternary aromatic amines and quaternary alkyl substituted aromatic amines (synergistic combinant). These compounds may be selected from certain sulfur compounds and acetylenic alcohols. When the synergistic combinant is an acetylenic alcohol, it may have the general formula: C$_n$H$_{2n-3}$OH, and include alcohols such as propargyl alcohol, 2-methyl-3-butyn-2-ol, butyne and diol, and 1-butyne-1-ol.

When the synergistic compound is a sulfur compound it may be selected from several groups of compounds. The first of these groups is compounds adhering to the general formula:

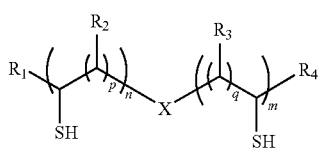

wherein x is carbon, oxygen, nitrogen, or sulfur; R1, R2, R3, and R4 are independently hydrogen or methyl; m and n are independently integers from 1 to 5; and p and q are independently integers from 1 to 4. Specific but non-limiting examples of this group include bis-2(-mercapto-1-methylpropyl) sulfide, 2-mercaptoethyl sulfide, 2-mercaptoethyl ether, 1,5-pentane dithiol, and the like.

The second group of compounds includes those compounds adhering to the general formula:

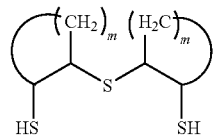

wherein m is an integer from 3 to 4. Specific but non-limiting examples of this group include bis-(2-mercaptocyclopentyl) sulfide, bis-2(2-mercaptocyclohexyl) sulfide, and the like.

The third group of compounds includes those having the general formula:

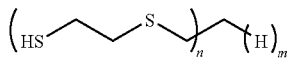

wherein m is an integer from 1 to 4 and n=4−m. Specific but non-limiting examples of this group include tetrakis-(4-mercapto-2-thiabutyl)methane and the like.

The fourth group of compounds includes simple mercaptoalcohols. In particular, suitable mercaptoalcohols have the formula:

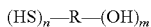

$(HS)_n$—R—$(OH)_m$ where R is a straight, branched, cyclic or heterocyclic alkylene, arylene, alkylarylene, arylalkylene, or hydrocarbon moiety having from 1 to 30 carbon atoms, and n and m each independently average from 1 to 3. The heteroatoms in the heterocyclic moiety substituent may be N, O, S and/or P. In some embodiments, R has from 1 to about 24 carbon atoms, and n averages from 1 to 2. In another embodiment, R is a straight chain hydrocarbon moiety having from 1 to 8 carbon atoms, n is 1 and m is 1 to 2; and in still another embodiment, R is an alkylene group and m is also 1. In another non-limiting embodiment, R has from 1 to 6 carbon atoms, sometimes 1 to 5 carbon atoms, and at other times, 1 to 4 carbon atoms.

In one non-limiting embodiment, the mercaptoalcohol is a water soluble mercaptoalcohol having the formula:

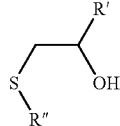

where R' and R" are independently selected from the group consisting of H, straight, branched, cyclic or heterocyclic, alkyl, aryl, alkyl aryl and arylalkyl where the heteroatom in the heterocyclic moiety is selected from the group consisting of N, O, S and P, and where the total number of carbon atoms in the mercaptoalcohol is from 1 to 8. In one non-limiting embodiment, the mercapto alcohol is 2-mercaptoethanol (2ME), 2-mercaptopropanol (2 MP) and 1mercapto-2-propanol (MP), and/or 2-mercaptobutanol (2 MB) or mixtures thereof. The above groups of compounds may be prepared by any means and methods known to those skilled in the mercaptan preparation art, including but not limiting to selection of sulfur-containing starting materials and sulfonation of non-sulfur-containing starting materials. Examples of non-limiting methods include those described in Buter, J. and Kellogg, R. M., "Synthesis of Sulfur-Containing Macrocycles Using Cesium Thiolates," J. Org. Chem., 1981, 46, 4481-4485, Ochrymowycz, L. A., Mak, C-P., Michna, J. D., "Synthesis of Macrocyclic Polythioethers," J. Org. Chem., Vol. 39, No. 14, 1974, 2079-2084; and Gerber, D., Chongsawangvirod, P., Leung, A., Ochrymowycz, L. A., "Monocyclic Polythioether 1,4,7-Trithiocyclononane," J. Org. Chem., 1977, 42, 2644-2645; all of which are incorporated herein by reference in their entireties.

The synergistic combinant compounds may be used to enhance the protective properties of the corrosion inhibiting compositions. In some embodiments, the synergistic combination of components in the corrosion inhibitor useful with the method of the disclosure may reduce corrosion rates by as much as 100% as compared to the same mass of quat aromatic amine. In other embodiments, the reduction in corrosion may be as much as one or more orders of magnitude.

The additives of the method of the application may be used in any concentration that is useful for mitigation or preventing metal corrosion within the system being treated. For example, pure amines that are amines that have not been converted to salts are comparatively uncorrosive. In such an embodiment, an amine $CO_2$ capture unit will not require much additive when it first started up. In contrast, heat stable salts, which form over time as an amine system is operated in the presence of heat and/or oxygen, are very corrosive. As the concentration of these salts build, then the required dosage of the additive will need to be increased.

One of ordinary skill in the art of operating a unit, such as a $CO_2$ capture unit will be well versed in testing their system and determining a proper dosage. However, generally, the concentration of additives used with the methods of the application may range from about 15 ppm to 2000 ppm. In some applications, the range may be from about 25 to about 1000 ppm. In still other applications, the range may be from about 30 to about 500 ppm.

EXAMPLES

The following examples are provided to illustrate the invention. The examples are not intended to limit the scope of the invention and they should not be so interpreted. Amounts are in weight parts or weight percentages unless otherwise indicated.

Example 1

A group of compounds are tested for their efficiency as corrosion inhibitors. The compounds were tested using a kettle test wherein a solution was subjected to a continuous purge of nitrogen having 14 wt % $CO_2$ and 3 wt % $O_2$ at a temperature of 205° F. (96.1° C.) for 2-24 hours. Corrosion rates were tested using an electrochemical corrosion test apparatus which consists of a 2 liter beaker equipped with an $O_2/CO_2$ sparge, carbon steel coupon, and an electrochemical probe, and a magnetic stir bar. The reference electrode and counter electrode used in making the electrochemical corrosion measurements are constructed of HASTELLOY® metal.

The solution included an additive present at a concentration shown in Table 1, tested in 15 wt % monoethanolamine (MEA) in presence of 0.4% heat stable salts (HSS) (bicine, oxalic acid, formic acid). Corrosion is reported in mil(s) per year (mpy) (0.0254 mm per year (mm/y). The "Blank" corrosion morning rate is 50 mils per year (mpy) (1.27 mm/y).

The corrosion inhibitors and comparatives used were:
A: benzyl pyridinium quat;
B: quinoline benzyl quat;
C: 2-mercaptoethylsulfide; and
D: propargyl alcohol.

The results are shown below in Table 1

TABLE 1

| Solution | Corrosion inhibitor | Concentration (ppm) | CR mpy/mm/y |
|---|---|---|---|
| 15% MEA + 0.4% HSS | none | — | 50/1.27 |
| 15% MEA + 0.4% HSS | A | 100 | 2/0.051 |
| 15% MEA + 0.4% HSS | B | 100 | 0.3/0.008 |
| 15% MEA + 0.4% HSS | Ethoxylated phosphate ester* | 100 | 38/0.965 increased to 48/1.22 |
| 15% MEA + 0.4% HSS | D* | 100 | 23/0.584 increased to 45/1.14 |
| 15% MEA + 0.4% HSS | C* | 100 | 48/1.22 |

*Not an example.

Example 2

Example 1 was reproduced substantially identically except that the concentration of heat stable salts is 0.2%.

TABLE 2

| Solution | Corrosion inhibitor | Concentration (ppm) | CR mpy/mm/y |
|---|---|---|---|
| 15% MEA + 0.2% HSS | none | — | 27/0.686 |
| 15% MEA + 0.2% HSS | A | 10 | 24/0.610 |
| 15% MEA + 0.2% HSS | C | 10 | 43/1.09 |
| 15% MEA + 0.2% HSS | A + C | 10 | 0.8/0.020 |

Example 3

Example 1 was repeated substantially identically except that the mixture of component A and D and a ratio of 3:1 was used to reduce corrosion rates from 131 mpy (3327 mm/y) to 2.2 mpy (56 mm/y).

DISCUSSION OF THE EXAMPLES

In Example 1, components A and B are shown to be effective corrosion inhibitors. Components C and D, synergistic combinants, are not. In Example 2, a synergistic combination of A and C shows that it has a corrosion rate that is nearly three orders of magnitude lower than the value expected based on their individual ability to inhibit corrosion. Example 3 demonstrates the use of compound D as a synergistic combinant.

The invention claimed is:
1. A method for mitigating or preventing corrosion of metal, the method comprising adding an additive to a system wherein the system has conditions selected from the group consisting of:
the system has both $O_2$ and $CO_2$ present; and
the system is at an alkaline pH and has both $O_2$ and $CO_2$ present; and the additive comprises a benzyl pyridinium quat corrosion inhibitor and a synergistic combinant selected from the group consisting of propargyl alcohol and 2-mercaptoethyl sulfide; wherein the $O_2$ is present at a concentration of at least 1 ppm and the $CO_2$ is present at a concentration of at least 3 percent; wherein the system is a system for capturing and sequestering $CO_2$ produced from the combustion of fossil fuels; and the system is utilized to convey or retain combustion gases.

2. In a process for capturing and sequestering $CO_2$ produced from the combustion of fossil fuels where a system is utilized to convey or retain combustion gases and those combustion gases include $O_2$ and $CO_2$, the improvement comprising employing a benzyl pyridinium quat corrosion inhibitor and a synergistic combinant selected from the group consisting of propargyl alcohol and 2-mercaptoethyl sulfide, wherein the $O_2$ is present at a concentration of at least 1 ppm and the $CO_2$ is present at a concentration of at least 3 percent.

* * * * *